US012534325B2

(12) United States Patent
Aono

(10) Patent No.: US 12,534,325 B2
(45) Date of Patent: Jan. 27, 2026

(54) SHEET PROCESSING SYSTEM AND OPERATION CONTROL METHOD CAPABLE OF SUPPRESSING OCCURRENCE OF DEFECT

(71) Applicant: KYOCERA Document Solutions Inc., Osaka (JP)

(72) Inventor: Shinya Aono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 257 days.

(21) Appl. No.: 18/427,746

(22) Filed: Jan. 30, 2024

(65) Prior Publication Data

US 2024/0308808 A1 Sep. 19, 2024

(30) Foreign Application Priority Data

Mar. 13, 2023 (JP) ................................ 2023-038437

(51) Int. Cl.
*B65H 29/00* (2006.01)
*B41J 3/44* (2006.01)

(52) U.S. Cl.
CPC ................ *B65H 29/00* (2013.01); *B41J 3/44* (2013.01); *B65H 2403/923* (2013.01); *B65H 2513/51* (2013.01)

(58) Field of Classification Search
CPC .. B65H 29/00; B65H 37/00; B65H 2403/923; B65H 2513/51; B41J 3/44
See application file for complete search history.

(56) References Cited

U.S. PATENT DOCUMENTS 8,432,571 B2 * 4/2013 Kato .................... G06F 3/1296 399/9
9,648,189 B2 * 5/2017 Imamura ........... G03G 15/5004
10,126,692 B2 * 11/2018 Aoki ................... G03G 15/205

FOREIGN PATENT DOCUMENTS

JP H0811299 A 1/1996
JP 2004268342 A * 9/2004

* cited by examiner

*Primary Examiner* — Leslie A Nicholson, III
(74) *Attorney, Agent, or Firm* — Alleman Hall & Tuttle LLP

(57) ABSTRACT

A sheet processing system includes a drive portion and a supply processing portion. The drive portion is provided in a post-processing apparatus configured to execute predetermined post-processing on a sheet conveyed from an image forming apparatus configured to form an image on the sheet, and generates a driving force to be transmitted to a constituent member of the post-processing apparatus in response to supply of a current. The supply processing portion supplies a current to the drive portion from arrival of a predetermined specific timing outside an execution period of output processing for outputting the sheet after image formation using the image forming apparatus and the post-processing apparatus until start of the output processing.

7 Claims, 4 Drawing Sheets

SHEET PROCESSING SYSTEM AND OPERATION CONTROL METHOD CAPABLE OF SUPPRESSING OCCURRENCE OF DEFECT

INCORPORATION BY REFERENCE

This application is based upon and claims the benefit of priority from the corresponding Japanese Patent Application No. 2023-038437 filed on Mar. 13, 2023, the entire contents of which are incorporated herein by reference.

BACKGROUND

The present disclosure relates to a sheet processing system and an operation control method.

In an inkjet-type image forming apparatus, a defect such as curling of a sheet may occur due to moisture contained in the sheet after image formation. To deal with this problem, a heat treatment apparatus that heats a sheet after image formation is known.

SUMMARY

A sheet processing system according to one aspect of the present disclosure includes a drive portion and a supply processing portion. The drive portion is provided in a post-processing apparatus configured to execute predetermined post-processing on a sheet conveyed from an image forming apparatus configured to form an image on the sheet, and generates a driving force to be transmitted to a constituent member of the post-processing apparatus in response to supply of a current. The supply processing portion supplies a current to the drive portion from arrival of a predetermined specific timing outside an execution period of output processing for outputting the sheet after image formation using the image forming apparatus and the post-processing apparatus until start of the output processing An operation control method according to another aspect of the present disclosure is executed in a sheet processing system including a drive portion provided in a post-processing apparatus configured to execute predetermined post-processing on a sheet conveyed from an image forming apparatus configured to form an image on the sheet, and configured to generate a driving force to be transmitted to a constituent member of the post-processing apparatus in response to supply of a current, and comprises supplying a current to the drive portion from arrival of a predetermined specific timing outside an execution period of output processing for outputting the sheet after image formation using the image forming apparatus and the post-processing apparatus until start of the output processing.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment will be described with reference to the accompanying drawings. It is noted that the following embodiment is an example of embodying the present disclosure and does not limit the technical scope of the present disclosure.

[Configuration of Image Forming System 100]

Figure 1:
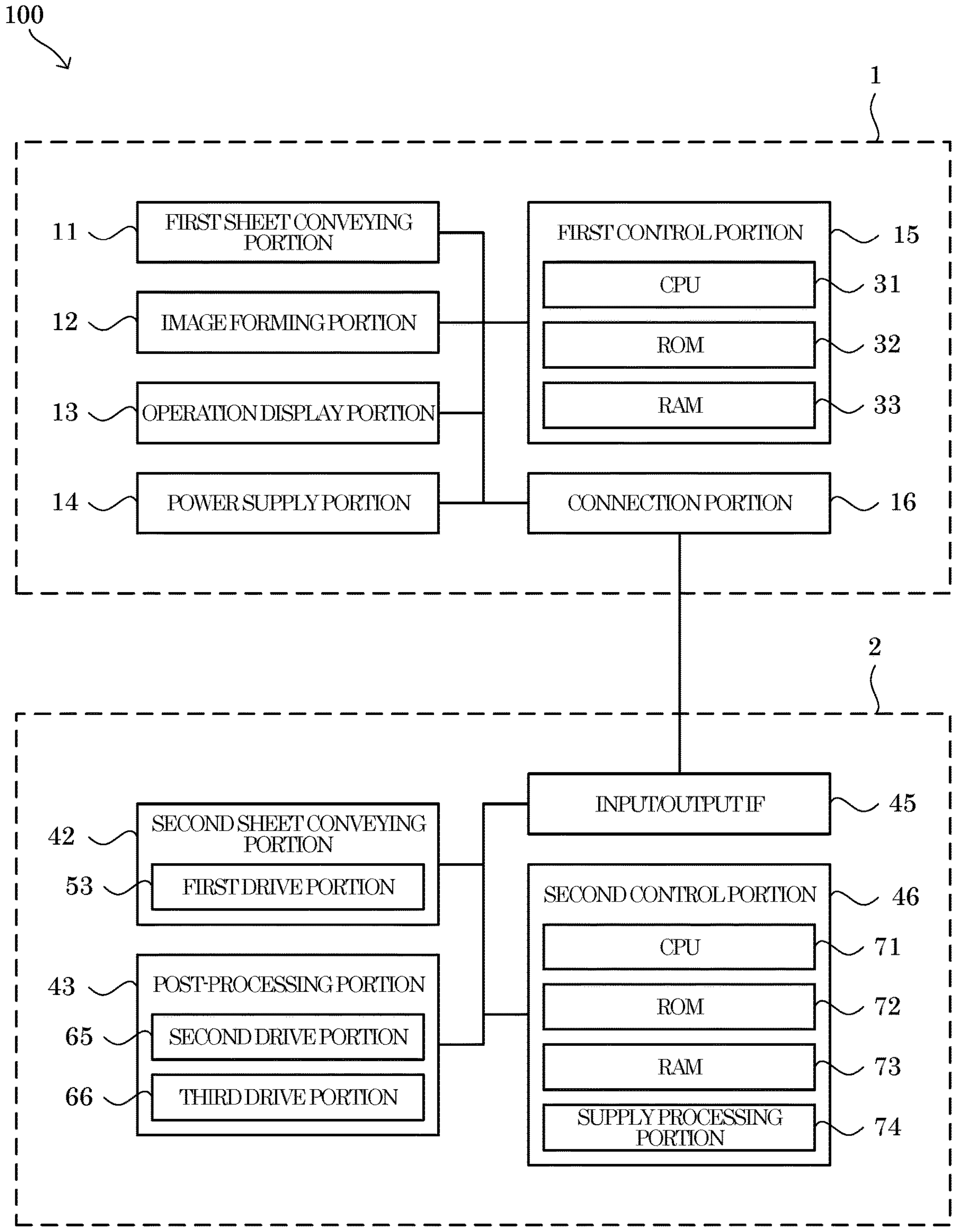
FIG. 1 is a diagram showing a configuration of an image forming system according to an embodiment of the present disclosure.

First, a configuration of an image forming system 100 according to the embodiment of the present disclosure will be described with reference to FIG. 1. Here, FIG. 1 is a block diagram showing a configuration of the image forming system 100. It is noted that, in FIG. 1, an image forming apparatus 1 and a post-processing apparatus 2 are indicated by broken lines.

As shown in FIG. 1, the image forming system 100 includes an image forming apparatus 1 and a post-processing apparatus 2.

The image forming apparatus 1 is a printer having a printing function for forming an image on a sheet based on image data. Specifically, the image forming apparatus 1 forms an ink image on a sheet in accordance with an inkjet method. It is noted that the image forming apparatus 1 may be a facsimile machine, a copier, or a multifunction peripheral which has the printing function. In addition, the image forming apparatus 1 may form an image on a sheet in accordance with an image forming method different from the inkjet method.

The post-processing apparatus 2 executes predetermined post-processing on a sheet after image formation conveyed from the image forming apparatus 1. Specifically, the post-processing includes stapling processing for binding a bundle of sheets using a staple. It is noted that the post-processing may include processing different from the stapling processing, such as punching processing for punching a hole in a sheet.

[Configuration of Image Forming Apparatus 1]

Next, a configuration of the image forming apparatus 1 will be described with reference to FIG. 1 and FIG. 2. Here, FIG. 2 is a cross-sectional view showing a configuration of the post-processing apparatus 2 attached to a first sheet discharge tray 22.

Figure 2:
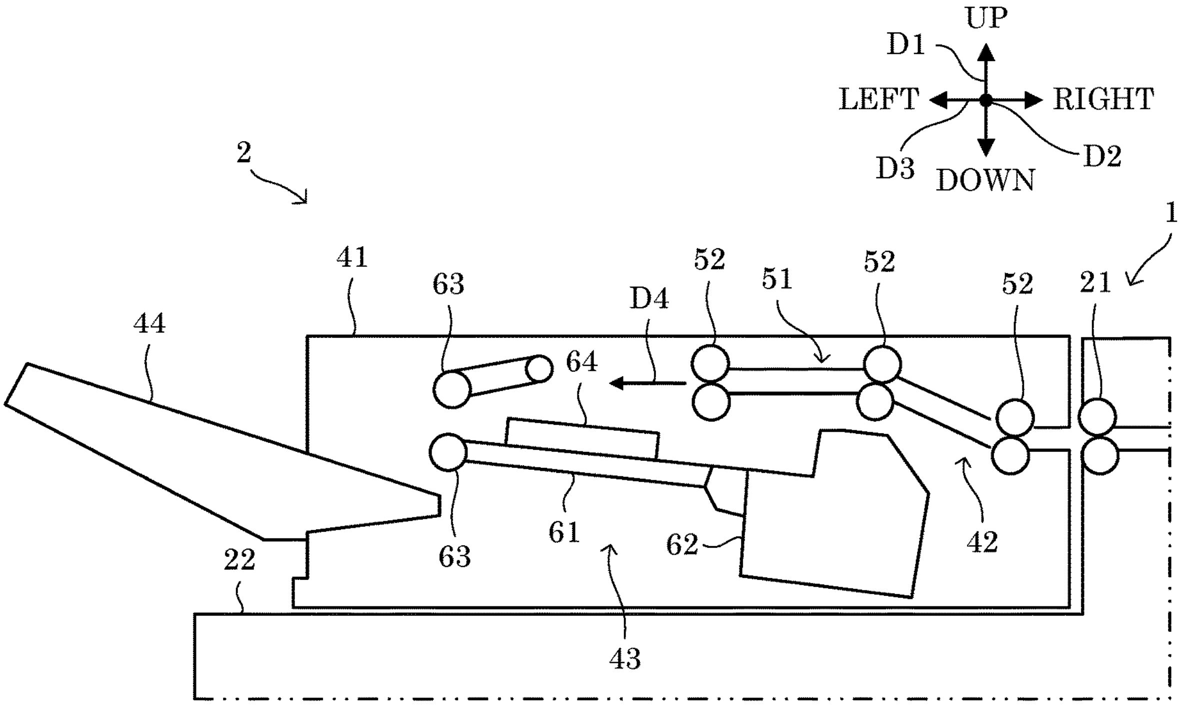
FIG. 2 is a diagram showing a configuration of a post-processing apparatus according to the embodiment of the present disclosure.

It is noted that, for convenience of description, the up-down direction on the paper surface in FIG. 2 is defined as an up-down direction D1 of the image forming apparatus 1. In addition, a front-rear direction D2 is defined assuming that the surface of the image forming apparatus 1 shown in FIG. 2 on the near side on the paper surface is the front side (front surface) of the image forming apparatus 1. In addition, a left-right direction D3 is defined with reference to the front side of the image forming apparatus 1.

As shown in FIG. 1, the image forming apparatus 1 includes a first sheet conveying portion 11, an image forming portion 12, an operation display portion 13, a power supply portion 14, a first control portion 15, and a connection portion 16.

The first sheet conveying portion 11 conveys a sheet on which an image is formed by the image forming portion 12. Specifically, the first sheet conveying portion 11 includes a sheet feed cassette, a sheet conveying path, and a plurality of conveying roller pairs.

In addition, the first sheet conveying portion 11 includes a first sheet discharge roller pair 21 (see FIG. 2) and a first sheet discharge tray 22 (see FIG. 2). The first sheet discharge roller pair 21 discharges a sheet on which an image has been formed by the image forming portion 12 to the first sheet discharge tray 22 when the post-processing apparatus 2 is not attached to the first sheet discharge tray 22. The first sheet discharge tray 22 is provided at the top of the housing of the image forming apparatus 1. The first sheet discharge tray 22 is used for stacking sheets after image formation in the image forming apparatus 1. Specifically, the first sheet discharge tray 22 receives a sheet discharged by the first sheet discharge roller pair 21 when the post-processing apparatus 2 is not attached. The first sheet discharge tray 22 is an example of the second sheet stacking portion of the present disclosure.

The image forming portion 12 implements the printing function. Specifically, the image forming portion 12 forms a color or monochrome image on a sheet conveyed by the first sheet conveying portion 11 in accordance with an inkjet method. The image forming portion 12 includes four line heads corresponding to printing colors: C (cyan), M (magenta), Y (yellow), and B (black). Each of the line heads ejects ink of a printing color corresponding to the line head onto a sheet.

The operation display portion 13 is a user interface of the image forming apparatus 1. The operation display portion 13 includes a display portion and an operation portion. The display portion displays various types of information in response to control instructions from the first control portion 15. The display portion is, for example, a liquid crystal display. The operation portion inputs various types of information to the first control portion 15 in response to user operations. For example, the operation portion is a touch panel.

The power supply portion 14 supplies power to each portion of the image forming apparatus 1. In addition, the power supply portion 14 supplies power to each portion of the post-processing apparatus 2 attached to the image forming apparatus 1. Specifically, the power supply portion 14 includes an AC/DC converter or a DC/DC converter capable of outputting a DC voltage of a predetermined voltage value.

The first control portion 15 performs overall control of the image forming system 100. Namely, the first control portion 15 controls the image forming apparatus 1 and the post-processing apparatus 2. It is noted that the first control portion 15 may be a control portion provided separately from a main control portion that performs overall control of the image forming system 100.

As shown in FIG. 1, the first control portion 15 includes a CPU 31, a ROM 32, and a RAM 33. The CPU 31 is a processor that executes various types of arithmetic processing. The ROM 32 is a nonvolatile storage device in which information such as control programs for causing the CPU 31 to execute various types of processing are stored in advance. The RAM 33 is a volatile or nonvolatile storage device used as a temporary storage memory (work area) for various types of processing executed by the CPU 31. The CPU 31 performs overall control of the image forming system 100 by executing various control programs stored in the ROM 32 in advance. It is noted that the first control portion 15 may be composed of an electronic circuit such as an integrated circuit (ASIC).

The first control portion 15 switches the operation mode of the image forming system 100 between a normal mode and a power saving mode.

Here, the power saving mode is an operation mode of the image forming system 100 in which power consumption is smaller than that in the normal mode. Specifically, in the power saving mode, power supply to some of the constituent elements of the image forming system 100 is stopped. The power supply stop targets in the power saving mode include the post-processing apparatus 2. That is, power supply to the post-processing apparatus 2 is stopped when the operation mode of the image forming system 100 is switched from the normal mode to the power saving mode.

Specifically, when the operation mode of the image forming system 100 is the normal mode and a predetermined transition condition is satisfied, the first control portion 15 switches the operation mode from the normal mode to the power saving mode.

For example, the transition condition includes a first transition condition and a second transition condition. The first control portion 15 switches the operation mode of the image forming system 100 to the power saving mode when either the first transition condition or the second transition condition is satisfied. The first transition condition is that a non-operation state in which no operation is input to the image forming system 100 continues beyond a predetermined time. The second transition condition is that an operation of inputting a transition instruction to the power saving mode is performed on the operation display portion 13. It is noted that the transition condition may include a condition different from the above-described conditions.

In addition, when the operation mode of the image forming system 100 is the power saving mode and a predetermined return condition is satisfied, the first control portion 15 switches the operation mode from the power saving mode to the normal mode.

For example, the return condition includes a first return condition and a second return condition. The first control portion 15 switches the operation mode of the image forming system 100 to the normal mode when either the first return condition or the second return condition is satisfied. The first return condition is to receive an instruction to execute output processing transmitted from an external information processing apparatus. The output processing is processing for outputting a sheet after image formation using the image forming apparatus 1 and the post-processing apparatus 2. That is, the output processing is processing for forming images on sheets using the image forming apparatus 1, binding a bundle of sheets after image formation using the post-processing apparatus 2, and outputting the bound bundle of sheets after image formation to the second sheet discharge tray 44 of the post-processing apparatus 2. The second return condition is that the operation display portion 13 is operated. It is noted that the return condition may include a condition different from the above-described conditions. Alternatively, the output processing may be processing for forming an image on a sheet using the image forming apparatus 1 and outputting the sheet after image formation to a sheet processing tray 61 of the post-processing apparatus 2.

When the operation mode of the image forming system 100 is switched from the normal mode to the power saving mode, the first control portion 15 inputs a control signal to the power supply portion 14 to stop power supply to some of the constituent elements of the image forming system 100. In addition, when the operation mode of the image forming system 100 is switched from the power saving mode to the normal mode, the first control portion 15 inputs a control signal to the power supply portion 14 to resume power supply to some of the constituent elements of the image forming system 100.

The connection portion 16 is a connector for electrically connecting the image forming apparatus 1 and the post-processing apparatus 2. The power supply portion 14 supplies power via the connection portion 16 to each portion of the post-processing apparatus 2 connected to the connection portion 16. The first control portion 15 controls, via the connection portion 16, the post-processing apparatus 2 connected to the connection portion 16.

[Configuration of Post-Processing Apparatus 2]

Figure 3:
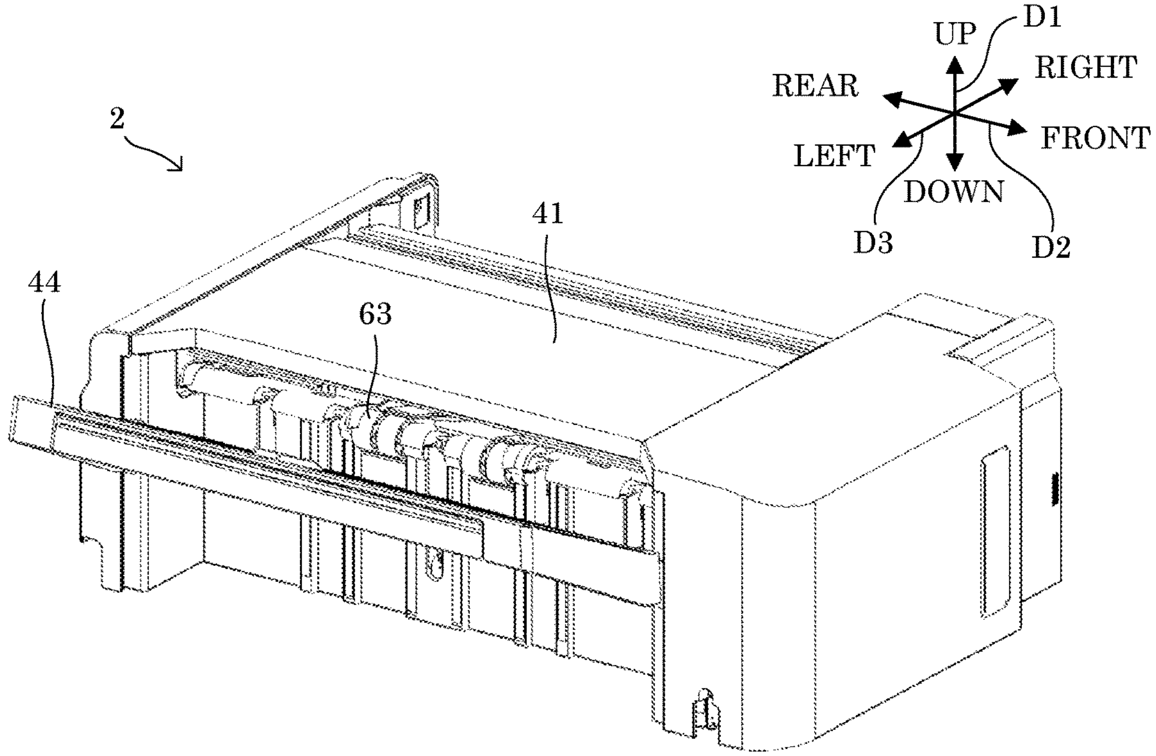
FIG. 3 is a diagram showing a configuration of the post-processing apparatus according to the embodiment of the present disclosure.

Next, a configuration of the post-processing apparatus 2 will be described with reference to FIG. 1 to FIG. 3. Here, FIG. 3 is a perspective view showing an exterior configuration of the post-processing apparatus 2.

The post-processing apparatus 2 is attached to the first sheet discharge tray 22 of the image forming apparatus 1 (see FIG. 2). The post-processing apparatus 2 is a type of post-processing apparatus called an inner type. It is noted that the post-processing apparatus 2 may be a so-called floor type or saddle type post-processing apparatus provided adjacent to the image forming apparatus 1 on the installation surface on which the image forming apparatus 1 is installed.

As shown in FIG. 1 and FIG. 2, the post-processing apparatus 2 includes a housing 41, a second sheet conveying portion 42, a post-processing portion 43, a second sheet discharge tray 44, an input/output IF 45, and a second control portion 46.

The housing 41 houses the constituent elements of the post-processing apparatus 2. As shown in FIG. 2, the housing 41 is placed on the top surface of the first sheet discharge tray 22 of the image forming apparatus 1. As shown in FIG. 3, the housing 41 is formed in a substantially rectangular parallelepiped shape.

The second sheet conveying portion 42 conveys the sheet conveyed from the image forming apparatus 1 to the post-processing portion 43. As shown in FIG. 1 and FIG. 2, the second sheet conveying portion 42 includes a sheet conveying path 51, a plurality of conveying roller pairs 52, and a first drive portion 53. The sheet conveying path 51 guides the sheet discharged from the first sheet discharge roller pair 21 to the sheet processing tray 61 of the post-processing portion 43. The sheet conveying path 51 extends from the first sheet discharge roller pair 21 to the post-processing portion 43 along a direction in which the sheet is discharged by the first sheet discharge roller pair 21. The plurality of conveying roller pairs 52 are provided on the sheet conveying path 51 and convey the sheet in a conveying direction D4 shown in FIG. 2.

The first drive portion 53 generates a driving force to be transmitted to the plurality of conveying roller pairs 52 in response to supply of current. For example, the first drive portion 53 is a stepping motor. The first drive portion 53 is supplied with a predetermined first driving current when the first drive portion 53 is rotationally driven during execution of the output processing. Each of the conveying roller pairs 52 rotates under a rotational driving force supplied from the first drive portion 53 through a power transmission mechanism (not shown). The first driving current is predetermined so as to allow the plurality of conveying roller pairs 52 to convey the sheet. In addition, the first drive portion 53 is supplied with a predetermined first holding current when the first drive portion 53 is stopped during execution of the output processing. The first holding current is a current smaller than the first driving current. For example, the first drive portion 53 is provided inside the front outer wall (see FIG. 3) of the housing 41. The plurality of conveying roller pairs 52 are an example of the conveying member of the present disclosure and an example of the constituent member of the present disclosure. In addition, the first holding current is an example of the first current of the present disclosure.

The post-processing portion 43 executes the stapling processing on a plurality of sheets conveyed from the image forming apparatus 1. As shown in FIG. 1 and FIG. 2, the post-processing portion 43 includes a sheet processing tray 61, a stapling portion 62, a second sheet discharge roller pair 63, a pair of aligning members 64, a second drive portion 65, and a third drive portion 66.

Sheets after image formation conveyed from the image forming apparatus 1 are stacked on the sheet processing tray 61. Specifically, the sheets to be conveyed by the second sheet conveying portion 42 are stacked on the sheet processing tray 61. The sheet processing tray 61 is an example of the first sheet stacking portion of the present disclosure.

The stapling portion 62 is provided on the sheet processing tray 61 so as to be movable in a sheet width direction (the same direction as the front-rear direction D2) orthogonal to the sheet conveying direction D4 (see FIG. 2), and executes the stapling processing for binding a bundle of sheets stacked on the sheet processing tray 61. The stapling portion 62 is formed in a substantially rectangular parallelepiped shape. As shown in FIG. 2, the stapling portion 62 is provided at an upstream end in the conveying direction D4 of the sheet processing tray 61.

The second sheet discharge roller pair 63 discharges the bundle of sheets bound by the stapling portion 62 to the second sheet discharge tray 44.

The pair of aligning members 64 align a bundle of sheets stacked on the sheet processing tray 61. Specifically, the pair of aligning members 64 are provided on the sheet processing tray 61 such that they can interlock with each other in a direction in which they come into contact with each other along the front-rear direction D2 and in a direction in which they are separated from each other. The pair of aligning members 64 are brought into contact with both ends in the front-rear direction D2 of the bundle of sheets stacked on the sheet processing tray 61 to align the bundle of sheets.

The second drive portion 65 generates a driving force to be transmitted to the stapling portion 62 in response to supply of current. For example, the second drive portion 65 is a stepping motor. The second drive portion 65 is supplied with a predetermined second driving current when the second drive portion 65 is rotationally driven during execution of the output processing. The stapling portion 62 moves under a driving force supplied from the second drive portion 65 via a power transmission mechanism (not shown). The second driving current is predetermined so that the stapling portion 62 can move. In addition, the second drive portion 65 is supplied with a predetermined second holding current when the second drive portion 65 is stopped during execution of the output processing. The second holding current is a current smaller than the second driving current. For example, the second drive portion 65 is provided below the sheet processing tray 61. The stapling portion 62 is an example of the constituent member of the present disclosure. In addition, the second holding current is an example of the first current of the present disclosure.

The third drive portion 66 generates a driving force to be transmitted to the pair of aligning members 64 in response to supply of current. For example, the third drive portion 66 is a stepping motor. The third drive portion 66 is supplied with a predetermined third driving current when the third drive portion 53 is rotationally driven during execution of the output processing. The pair of aligning members 64 moves under a driving force supplied from the third drive portion 66 via a power transmission mechanism (not shown). The third driving current is predetermined so as to allow the pair of aligning members 64 to align the bundle of sheets. In addition, the third drive portion 66 is supplied with a predetermined third holding current when the third drive portion 66 is stopped during execution of the output processing. The third holding current is smaller than the third driving current. For example, the third drive portion 66 is provided below the sheet processing tray 61. The third holding current is an example of the first current of the present disclosure.

The input/output IF 45 is an interface for processing an electrical signal input from the image forming apparatus 1 and an electrical signal output to the image forming apparatus 1. In addition, the input/output IF 45 is supplied with power used for driving each portion of the post-processing apparatus 2 from the power supply portion 14 of the image forming apparatus 1 via the connection portion 16.

The second control portion 46 controls the post-processing apparatus 2. As shown in FIG. 1, the second control portion 46 includes a CPU 71, a ROM 72, and a RAM 73. The functions of the CPU 71, the ROM 72, and the RAM 73 are the same as those of the CPU 31, the ROM 32, and the RAM 33. It is noted that the second control portion 46 may be composed of an electronic circuit such as an integrated circuit (ASIC).

By the way, in an inkjet-type image forming apparatus, a defect such as curling of a sheet may occur due to moisture contained in the sheet after image formation. To deal with this problem, a heat treatment apparatus that heats the sheet after image formation is known.

Here, even in the post-processing apparatus attached to the image forming apparatus, a defect such as curling of a sheet may occur due to moisture contained in the sheet after image formation. However, conventionally, there has been no configuration in the post-processing apparatus that can suppress the occurrence of the defect caused by moisture contained in the sheet after image formation.

In contrast, the image forming system 100 according to the embodiment of the present disclosure can suppress the occurrence of a defect caused by moisture contained in the sheet after image formation, as will be described below.

[Configuration of Second Control Portion 46]

Next, a configuration of the second control portion 46 will be described with reference to FIG. 1.

As shown in FIG. 1, the second control portion 46 includes a supply processing portion 74. The post-processing apparatus 2 including the supply processing portion 74 is an example of the sheet processing system of the present disclosure.

Specifically, the ROM 72 of the second control portion 46 stores in advance an operation control program for causing the CPU 71 to function as the supply processing portion 74. By executing the operation control program stored in the ROM 72, the CPU 71 functions as the supply processing portion 74. It is noted that the supply processing portion 74 may be constituted by an electronic circuit.

The supply processing portion 74 supplies current to the first drive portion 53, the second drive portion 65, and the third drive portion 66 from the arrival of a predetermined specific timing outside the execution period of the output processing for outputting a sheet after image formation using the image forming apparatus 1 and the post-processing apparatus 2 until the start of the output processing.

For example, the specific timing includes a timing at which power supply to the post-processing apparatus 2 is started. It is noted that the power supply to the post-processing apparatus 2 is started when the power of the image forming apparatus 1 is turned on and when the operation mode of the image forming system 100 is shifted from the power saving mode to the normal mode.

For example, the supply processing portion 74 supplies a first specific current higher than the first holding current to the first drive portion 53. The first specific current may be a current less than the first driving current or a current equal to or greater than the first driving current. The larger the first specific current, the larger the amount of heat generated by the first drive portion 53 supplied with the first specific current. For example, the supply processing portion 74 controls the output of a constant-current power supply (not shown) that supplies power to the first drive portion 53 to supply the first specific current to the first drive portion 53. In addition, the supply processing portion 74 supplies the first specific current in a state where the first drive portion 53 is stopped. That is, in the image forming system 100, a pulse signal is not input to the first drive portion 53 during the supply of the first specific current to the first drive portion 53. It is noted that the supply processing portion 74 may rotationally drive the first drive portion 53 during the supply of the first specific current to the first drive portion 53. The first specific current is an example of the second current of the present disclosure.

In addition, the supply processing portion 74 supplies a second specific current higher than the second holding current to the second drive portion 65. The second specific current may be a current less than the second driving current or a current equal to or greater than the second driving current. The larger the second specific current, the larger the amount of heat generated by the second drive portion 65 supplied with the second specific current. For example, the supply processing portion 74 controls the output of a constant-current power supply (not shown) that supplies power to the second drive portion 65 to supply the second specific current to the second drive portion 65. In addition, the supply processing portion 74 supplies the second specific current in a state where the second drive portion 65 is stopped. It is noted that the supply processing portion 74 may rotationally drive the second drive portion 65 during the supply of the second specific current to the second drive portion 65. The second specific current is an example of the second current of the present disclosure.

In addition, the supply processing portion 74 supplies a third specific current higher than the third holding current to the third drive portion 66. The third specific current may be a current less than the third driving current or a current equal to or greater than the third driving current. The larger the third specific current, the larger the amount of heat generated by the third drive portion 66 supplied with the third specific current. For example, the supply processing portion 74 controls the output of a constant-current power supply (not shown) that supplies power to the third drive portion 66 to supply the third specific current to the third drive portion 66. In addition, the supply processing portion 74 supplies the third specific current in a state where the third drive portion 66 is stopped. It is noted that the supply processing portion 74 may rotationally drive the third drive portion 66 during the supply of the third specific current to the third drive portion 66. The third specific current is an example of the second current of the present disclosure.

It is noted that the post-processing apparatus 2 may include a temperature sensor capable of detecting the internal temperature of the housing 41. In this case, the specific timing may be a timing at which it is determined that the internal temperature of the housing 41 detected by the temperature sensor is less than a predetermined first reference temperature. For example, the first reference temperature is 40 degrees. When it is determined that the internal temperature of the housing 41 detected by the temperature sensor after the arrival of the specific timing exceeds a second reference temperature that is equal to or greater than the first reference temperature, the supply processing portion 74 may decrease the current supplied to the first drive portion 53, the second drive portion 65, and the third drive portion 66 until the start of the output processing. For example, the second reference temperature is 50 degrees. For example, the supply processing portion 74 may decrease the current supplied to the first drive portion 53 from the first specific current to the first holding current. In addition, the supply processing portion 74 may decrease the current supplied to the second drive portion 65 from the second specific current to the second holding current. In addition, the supply processing portion 74 may decrease the current supplied to the third drive portion 66 from the third specific current to the third holding current.

In addition, the supply processing portion 74 may supply current to some of the first drive portion 53, the second drive portion 65, and the third drive portion 66 from the arrival of the specific timing to the start of the output processing.

In addition, the supply processing portion 74 may supply the first holding current to the first drive portion 53, the second holding current to the second drive portion 65, and the third holding current to the third drive portion 66 from the arrival of the specific timing to the start of the output processing.

[Operation Control Processing]

Figure 4:
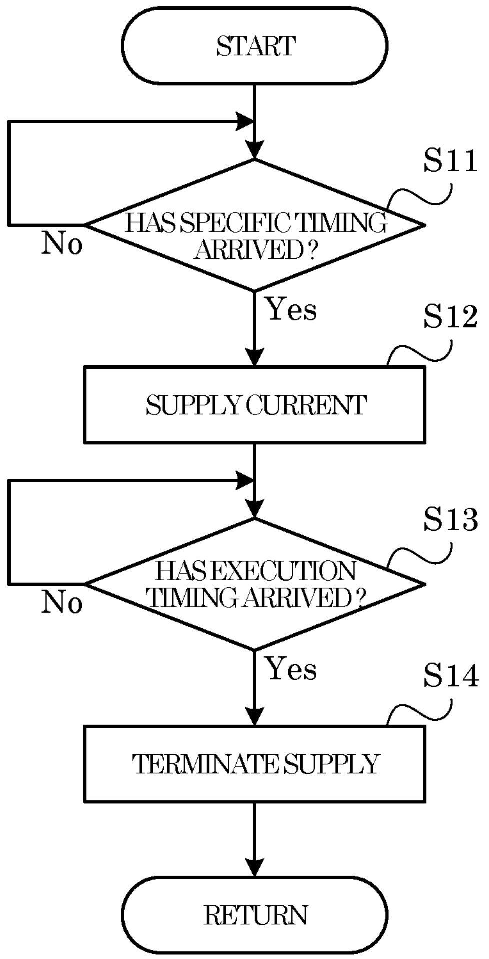
FIG. 4 is a flowchart showing an example of operation control processing executed in an image forming system according to the embodiment of the present disclosure.

The operation control method of the present disclosure will be described below with reference to FIG. 4, along with an example of the procedure of the operation control processing executed by the second control portion 46 in the post-processing apparatus 2. Here, steps S11, S12, . . . represent the numbers of the processing procedure (steps) executed by the second control portion 46.

<Step S11>

First, in step S11, the second control portion 46 determines whether or not the specific timing has arrived.

Specifically, the second control portion 46 determines that the specific timing has arrived when startup processing of the post-processing apparatus 2, which is executed in response to the start of power supply to the post-processing apparatus 2, is completed.

Here, when the second control portion 46 determines that the specific timing has arrived (Yes in S11), the second control portion 46 shifts the processing to step S12. When the specific timing has not arrived (No in S11), the second control portion 46 waits for the arrival of the specific timing in step S11.

<Step S12>

In step S12, the second control portion 46 supplies current to the first drive portion 53, the second drive portion 65, and the third drive portion 66.

Specifically, the second control portion 46 supplies the first specific current to the first drive portion 53. The second control portion 46 also supplies the second specific current to the second drive portion 65. The second control portion 46 also supplies the third specific current to the third drive portion 66.

<Step S13>

In step S13, the second control portion 46 determines whether or not the execution timing of the output processing has arrived.

Specifically, when being notified by the image forming apparatus 1 of the start of the output processing, the second control portion 46 determines that the execution timing of the output processing has arrived.

Here, when the second control portion 46 determines that the execution timing of the output processing has arrived (Yes in S13), the second control portion 46 shifts the processing to step S14. When the execution timing of the output processing has not arrived (No in S13), the second control portion 46 waits for the arrival of the execution timing of the output processing in step S13.

<Step S14>

In step S14, the second control portion 46 terminates the supply of current to the first drive portion 53, the second drive portion 65, and the third drive portion 66. The processing from step S11 to step S14 is executed by the supply processing portion 74 of the second control portion 46.

Specifically, the second control portion 46 terminates the supply of the first specific current to the first drive portion 53. It is noted that the second control portion 46 may stop the supply of the current to the first drive portion 53, or may decrease the current supplied to the first drive portion 53 to the first holding current. In addition, the second control portion 46 terminates the supply of the second specific current to the second drive portion 65. It is noted that the second control portion 46 may stop the supply of the current to the second drive portion 65 or may decrease the current supplied to the second drive portion 65 to the second holding current. In addition, the second control portion 46 terminates the supply of the third specific current to the third drive portion 66. It is noted that the second control portion 46 may stop the supply of the current to the third drive portion 66 or may decrease the current supplied to the third drive portion 66 to the third holding current.

As described above, in the image forming system 100, current is supplied to the first drive portion 53, the second drive portion 65, and the third drive portion 66 from the arrival of the specific timing outside the execution period of the output processing to the start of the output processing. This allows the first drive portion 53, the second drive portion 65, and the third drive portion 66 to generate heat to warm the inside of the housing 41 of the post-processing apparatus 2 before the execution of the output processing. When the temperature inside the housing 41 rises, drying of the sheet conveyed by the second sheet conveying portion 42 is accelerated. Therefore, it is possible to suppress the occurrence of a defect caused by moisture contained in the sheet after image formation.

In addition, in the image forming system 100, the first specific current higher than the first holding current is supplied to the first drive portion 53 from the arrival of the specific timing to the start of the output processing. Thus, the amount of heat generated by the first drive portion 53 can be increased as compared with a configuration in which the first holding current is supplied to the first drive portion 53 from the arrival of the specific timing to the start of the output processing.

It is noted that the supply processing portion 74 may be included in the first control portion 15 of the image forming apparatus 1. The image forming system 100 including the supply processing portion 74 is another example of the sheet processing system of the present disclosure.

It is noted that the drive portions of the present disclosure are not limited to the stepping motor, and may be a motor of a type different from the stepping motor, a solenoid, an electromagnetic clutch, or the like.

APPENDIXES TO DISCLOSURE

The following are appendixes to the overview of the disclosure extracted from the above embodiment. It is noted that the structures and processing functions to be described in the following appendixes can be selected and combined arbitrarily.

Appendix 1

A sheet processing system comprising: a drive portion provided in a post-processing apparatus configured to execute predetermined post-processing on a sheet conveyed from an image forming apparatus configured to form an image on the sheet, and configured to generate a driving force to be transmitted to a constituent member of the post-processing apparatus in response to supply of a current; and a supply processing portion configured to supply a current to the drive portion from arrival of a predetermined specific timing outside an execution period of output processing for outputting the sheet after image formation using the image forming apparatus and the post-processing apparatus until start of the output processing.

Appendix 2

The sheet processing system according to Appendix 1, wherein the drive portion includes a stepping motor supplied with a predetermined first current when the drive portion is stopped during execution of the output processing, and the supply processing portion supplies a second current higher than the first current to the stepping motor.

Appendix 3

The sheet processing system according to Appendix 1 or 2, wherein the constituent member includes a conveying member configured to convey the sheet.

Appendix 4

The sheet processing system according to any one of Appendixes 1 to 3, comprising a first sheet stacking portion provided in the post-processing apparatus, on which the sheet conveyed from the image forming apparatus is stacked, wherein the constituent member includes an aligning member configured to align the sheet stacked on the first sheet stacking portion.

Appendix 5

The sheet processing system according to any one of Appendixes 1 to 4, comprising the post-processing apparatus attached to a second sheet stacking portion used for stacking the sheet after image formation in the image forming apparatus.

Appendix 6

The sheet processing system according to any one of Appendixes 1 to 5, wherein the specific timing includes a timing at which power supply to the post-processing apparatus is started.

Appendix 7

An operation control method executed in a sheet processing system including a drive portion provided in a post-processing apparatus configured to execute predetermined post-processing on a sheet conveyed from an image forming apparatus configured to form an image on the sheet, and configured to generate a driving force to be transmitted to a constituent member of the post-processing apparatus in response to supply of a current, the operation control method comprising supplying a current to the drive portion from arrival of a predetermined specific timing outside an execution period of output processing for outputting the sheet after image formation using the image forming apparatus and the post-processing apparatus until start of the output processing.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet processing system comprising:

a drive portion provided in a post-processing apparatus configured to execute predetermined post-processing on a sheet conveyed from an image forming apparatus configured to form an image on the sheet, and configured to generate a driving force to be transmitted to a constituent member of the post-processing apparatus in response to supply of a current; and a supply processing portion configured to supply a current to the drive portion from arrival of a predetermined specific timing outside an execution period of output processing for outputting the sheet after image formation using the image forming apparatus and the post-processing apparatus until start of the output processing.

2. The sheet processing system according to claim 1, wherein the drive portion includes a stepping motor supplied with a predetermined first current when the drive portion is stopped during execution of the output processing, and the supply processing portion supplies a second current higher than the first current to the stepping motor.

3. The sheet processing system according to claim 1, wherein the constituent member includes a conveying member configured to convey the sheet.

4. The sheet processing system according to claim 1, comprising:

a first sheet stacking portion provided in the post-processing apparatus, on which the sheet conveyed from the image forming apparatus is stacked, wherein the constituent member includes an aligning member configured to align the sheet stacked on the first sheet stacking portion.

5. The sheet processing system according to claim 1, comprising the post-processing apparatus attached to a second sheet stacking portion used for stacking the sheet after image formation in the image forming apparatus.

6. The sheet processing system according to claim 1, wherein the specific timing includes a timing at which power supply to the post-processing apparatus is started.

7. An operation control method executed in a sheet processing system including a drive portion provided in a post-processing apparatus configured to execute predetermined post-processing on a sheet conveyed from an image forming apparatus configured to form an image on the sheet, and configured to generate a driving force to be transmitted to a constituent member of the post-processing apparatus in response to supply of a current, the operation control method comprising:

supplying a current to the drive portion from arrival of a predetermined specific timing outside an execution period of output processing for outputting the sheet after image formation using the image forming apparatus and the post-processing apparatus until start of the output processing.

* * * * *